(12) United States Patent
Schletterer

(10) Patent No.: US 6,525,888 B2
(45) Date of Patent: Feb. 25, 2003

(54) RADIALLY ADJUSTABLE LENS MOUNTING

(75) Inventor: Thomas Schletterer, Ossmanstedt (DE)

(73) Assignee: JENOPTIK Laser, Optik, Systeme GmbH, Jena (DE)

(*) Notice: Subject to any disclaimer, the term of this patent is extended or adjusted under 35 U.S.C. 154(b) by 0 days.

(21) Appl. No.: 09/931,148

(22) Filed: Aug. 16, 2001

(65) Prior Publication Data

US 2002/0027725 A1 Mar. 7, 2002

(30) Foreign Application Priority Data

Aug. 17, 2000 (DE) .......................... 100 42 844

(51) Int. Cl.⁷ ................................. G02B 7/02
(52) U.S. Cl. ................ 359/822; 359/813; 359/819
(58) Field of Search ...................... 359/811, 813, 359/819, 820, 822, 830

(56) References Cited

U.S. PATENT DOCUMENTS

| | | | |
|---|---|---|---|
| 6,366,413 B1 * | 4/2002 | Trunz et al. | 359/811 |
| 6,369,959 B1 * | 4/2002 | Trunz et al. | 359/819 |
| 6,392,825 B1 * | 5/2002 | Trunz et al. | 359/811 |

FOREIGN PATENT DOCUMENTS

| | | |
|---|---|---|
| DE | 37 12 79 | 3/1923 |
| DE | 206591 | 2/1984 |
| DE | 37 12 179 A1 | 6/1988 |
| DE | 37 30 094 A1 | 12/1988 |
| DE | 44 00 869 C1 | 3/1995 |
| FR | 242 88 52 | 1/1980 |
| FR | 78 17 588 | 1/1980 |

OTHER PUBLICATIONS

*English Abstract of DE 37 121 79A1.
*English Abstract of DE 37 30 094 A1.
*English Abstract of DE 44 00 869 C1.
*English Abstract of DE 37 12 79.
*English Abstract of DD 206591.

* cited by examiner

Primary Examiner—Georgia Epps
Assistant Examiner—Saeed Seyrafi
(74) Attorney, Agent, or Firm—Reed Smith LLP

(57) ABSTRACT

A radially adjustable lens mounting with a mounting ring, a lens and a large number of leaf spring elements each of which is firmly attached to the mounting ring at one end, the other end being in contact with a ring groove formed by the peripheral surface of the lens. The lens mounting allows a frictionless and tilt-free adjustment of the lens and holds the lens in a manner that is stable over a long time and is independent of thermal and mechanical stresses.

9 Claims, 3 Drawing Sheets

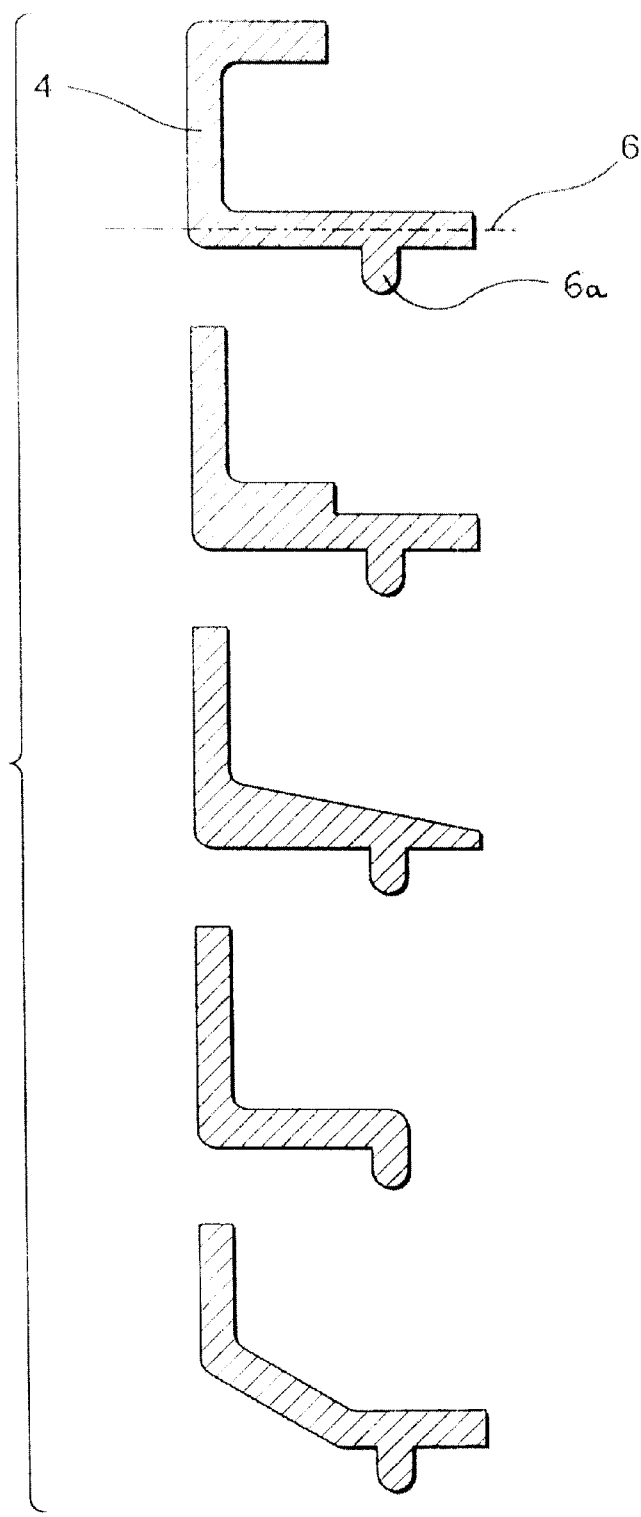
F I G. 3

RADIALLY ADJUSTABLE LENS MOUNTING

CROSS-REFERENCE TO RELATED APPLICATION

This application claims priority of German Application No. 100 42 844.4, filed Aug. 17, 2000, the complete disclosure of which is hereby incorporated by reference.

BACKGROUND OF THE INVENTION a) Field of the Invention

The invention is directed to a radially adjustable lens mounting like the one known from FR 2428852.

b) Description of the Related Art

Lens mountings are used for the precise mechanical mounting of optical lenses in precise positions within a lens system, meaning at particular distances and alignments to each other. Particularly in high-performance lenses, minute positional deviations of individual lenses can have undesired systematic errors as their consequence. For this reason, an adjustment is done after assembly of at least those lenses whose positional deviation has a critical effect on the lens system.

Only by means of these measures can the total error of the lens system be optimally corrected while taking all production tolerances of the individual lenses and of the mechanical components into consideration.

The exact alignment of the lens plane (the plane that is vertical to optical axis of the lens) relative to the optical axis of the lens is of particular importance for the adjustment of a high-performance lens. Centering the lenses on the optical axis of the lens system also has a very great influence on its precision. Both are achieved by an adjustment which is radial to the optical axis and as sensitive as possible while it avoids tilting the lens. Depending on the use of the optical system, other requirements with regards to thermal stability or positional security relative to mechanical stresses are added.

The devices necessary for this can be combined into radially adjustable lens mountings.

In such devices, the mounted or unmounted individual lens is moved on its lens plane relative to a mechanical base; the latter can be a lens tube, a mounting or an auxiliary mounting adjustable inside the main mounting.

Here, the decisive factor for the precision of adjustment is achieved in particular by means of a delicate movement and fixing of the lens without misadjustment.

From DE 37 12 179 A1 a radially adjustable lens mounting is known where a lens tube provides the mechanical base for the adjustment.

At an offset of 90 degrees, two auxiliary devices engage on the circumference of the lens tube; each of them consists of a so-called spring element and a so-called micrometer attachment arranged diametrically opposite to it. The spring element and the micrometer attachment are special mechanical subassemblies which can be removed and used for identical adjustments somewhere else after the adjusted lens has been fixed in place by means of another device provided for this purpose. The displacement in one direction is done by means of an adjustment screw guided in the spring element.

The overall solution including the auxiliary device and the fixing device integrated in the lens tube is a constructionally complicated solution. It is disadvantageous for the adjustment process that when the lens is moved in one adjusting direction this is always done against forces which are vertical to the direction of the adjusting movement and are being generated by the second auxiliary device. The friction created by this has the effect of causing a backwards sliding movement (slide-back) and thus reduces the sensitivity of the adjustment. Furthermore, the arrangement for fixing cited here, which for example consists of three clamping jaws, does not guarantee a no-tilt fixing, since they are tightened individually.

From DE 206 591 B1 an arrangement is known for which an auxiliary lens mounting (mechanical mounting) is arranged so as to be radially displaceable at right angles to the axis of the lens tube (axis of the device) within a gimbal mounted main mounting (holder). The displacement of the auxiliary lens mounting within the main mounting as well as the holding of the auxiliary lens mounting is done via radially engaging adjusting elements. Since the adjusting elements also fulfill a holding function, only mechanical adjusting screws can be used as adjusting elements. They all have to be released for the adjustment which means that the auxiliary lens mounting can slip out of alignment during the adjustment. The lens is fixed in position by tightening the adjustment screws. So that the fixing of the auxiliary lens mounting does not lead to a maladjustment, the adjustment screws must be tightened with an even force after contacting the auxiliary lens mounting; in practice, this appears to be difficult.

A solution comparable to DD 206 591 B1 with regards to the radial adjustment is described in OE-Reports, No. 67, p.13, July 1989, published by SPIE. An auxiliary lens mounting with two plane surfaces inside of which the lens is fixed can be adjusted vertical to the optical axis by means of adjusting elements within a main lens mounting. One of the plane surfaces of the auxiliary lens mounting rests on a plane surface of the main lens mounting so that friction results during the adjustment; this can lead to slide-back and thus counteracts the sensitivity of the adjustment. In contrast to the previous solution, though, the fixing is here done by means of the application of glue; this means that a maladjustment during fixing can not take place, since no mechanical forces are active, but it has to be said that the adjustment is also irreversible.

DE PS 37 30 094 C2 describes an arrangement where an auxiliary mounting which can be moved inside a main mounting is indirectly pushed against a base surface by means of the force of a spring acting vertical to the direction of displacement.

The forces determining this clamp-like connection have to be overcome during an adjustment radial to the optical axis and therefore counteract sensitivity.

For all solutions mentioned, the adjustment takes place in two orthogonal directions of adjustment relative to a mechanical base and by means of adjustment screws or headless setscrews. During an adjustment in one direction of adjustment, the adjustment screws or setscrews must either be released or their force of pressure must be overcome; both are disadvantageous for the adjustment process. If they are released when they are also fulfilling a holding function as well as the adjustment function, this can result in a renewed maladjustment in the already adjusted direction.

If they are not released, friction is created which can lead to slide-back. For solutions where an additional holding arrangement is present, this is normally either activated after the end of the adjustment process (DE 37 12 79) or its effect is at least partially cancelled during the adjustment process, as known from DE 44 00 869.

For the latter, piezo translators are inserted which generate a force which counteracts and partially compensates for the force of pressure generated in a main mounting (first mounting) for the defined holding of the auxiliary lens mounting during the adjustment so that a displacement of the auxiliary lens mounting is possible with little radial force. For this solution, too, the movement of mechanical parts against each other causes friction, which can lead to the slide-back previously mentioned.

Beyond the criticisms made, the application of all solutions described so far is limited when it comes to thermal or mechanical stresses.

In a mounting according to FR428852, the centering of a lens is done with barely any friction. Between lens and mounting, spring elements are arranged in indirect contact with the peripheral surface of the lens which effect an almost evenly distributed radially acting spring force between the mounting and the lens and are supposed to center the lens on the axis of the mounting. This spring force can be generated by a flat spring of different types which almost encloses the lens completely or by a large number of individual spring elements like compression springs or purpose-shaped leaf springs. By means of an adjusting screw engaging indirectly with the lens, an adjustment in one direction can be induced.

Since the rigidity of spring elements for a stress across the spring axis is much less than that of rigid elements, like for example an adjusting screw, they are deflected for small distances of adjustment so that there is no or only a negligible amount of friction at the contact surface between the lens and the spring element which could counteract the sensitivity of the adjustment.

For the adjustment, a retainer ring fixing the lens in its position must be released so that such an adjustable mounting can only be used for a lens delimiting a lens system, since otherwise there is no access to the retainer ring. Furthermore, a twisting of the lens while the retainer ring is being screwed on and therefore a maladjustment effected by this can not be avoided. During the adjustment, a direct measurement of the distance of movement is not possible for this solution.

This lens mounting appears to be suitable for thermal stresses, but mechanical stresses like impact shocks in an axial direction are passed on to the lens without damping.

OBJECT AND SUMMARY OF THE INVENTION

It is the primary object of this invention to create a new radially adjustable lens mounting which permits the radial adjustment of a lens arranged in an arbitrary location within a high-performance lens without the occurrence of tilting and with a high degree of sensitivity. Beyond this, the lens mounting should be temperature stable and capable of withstanding mechanical stresses.

This object is met for a radially adjustable lens mounting by realizing the spring elements as leaf spring elements whose one end is rigidly connected with the mounting and whose other end engages in a ring-shaped groove present on the peripheral surface of the lens by means of which the lens is held radially and axially. By means of a curvature of the leaf spring elements at their fixed ends, they also have a spring effect in the axial direction.

So that the leaf spring elements can engage in the ring groove, their free ends are shaped like claws. Accordingly, the leaf spring element is bent to an angle of 90 degrees or provided with a bead. The leaf spring element grips particularly well if the shape of the end bent at an angle of 90 degrees or of the bead is adapted to the cross-section of the groove.

The leaf spring elements have a curvature somewhere along their length, preferably near the fixed end. In the area of the free end, the leaf spring axes of the pre-tensioned springs are parallel to the axis of the mounting ring. If there is a deflection, two leaf spring elements arranged diametrically opposite to each other are therefore deflected by the same amount so that a tilting of the lens during the adjustment can not occur.

For a radial adjustment in only one direction, only one threaded borehole in the mounting ring through which a setscrew can act upon a leaf spring element arranged in front of it is required. By means of a second setscrew guided in a threaded borehole arranged at a 90 degree offset from the first one, a radial adjustment is possible in two directions and therefore within a plane. Since the leaf spring elements are pretensioned by the insertion of the lens in the lens ring in such a manner that this pretensioning is at least partially maintained along the entire distance of adjustment, no thrust bearing or any other further adjusting element is necessary, but it would be advantageous if another borehole were to be arranged diametrically opposite to each of the threaded boreholes with the setscrews; through it, an indicating caliper could be laid against a leaf spring element which has been deflected the opposite way compared to the leaf spring element deflected by means of the setscrew. Thus, the adjustment distance can be measured directly. If the setscrews are chosen so that the internal diameter of the threaded borehole is greater than the diameter of the probe of the indicating caliper, all boreholes can be realized as threaded boreholes with the same thread parameters. This permits the insertion of a setscrew or of the indicating caliper, depending on where access is better.

Advantageously, rectangular springs are chosen which when arranged close beside each other hold the lens radially by spring actuation and axially by means of a positive lock.

For the lens mounting according to the invention, no friction occurs between the parts moved relative to each other during the adjustment; instead, this relative movement between mounting ring and lens is compensated by a transverse deflection of the leaf spring elements. This enables a very sensitive adjustment without the occurrence of slideback.

Two valuable effects result from this for long-term stability; on the one hand, there is an ideal suitability for a great temperature range, since no distortions occur because of differing material expansion, and on the other hand, there is the continuous mechanical protection of the lens by means of the radially and axially sprung mounting of the lens through which the transfer of impacts from any direction is always damped.

Subsequently, the arrangement according to the invention is to be described in more detail using the accompanying drawings.

BRIEF DESCRIPTION OF THE DRAWINGS

In the drawings:

FIG. 3 shows a sectional view of different types of leaf spring.

DESCRIPTION OF THE PREFERRED EMBODIMENTS

Figure 1:
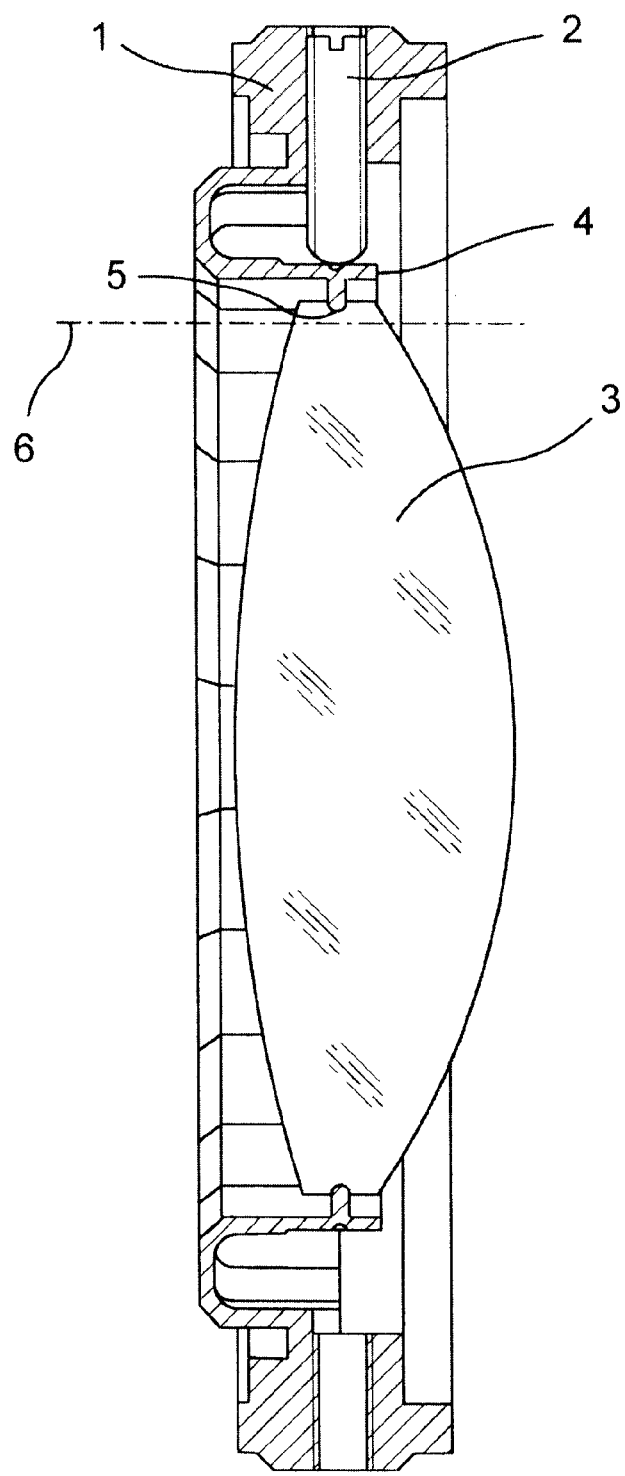
FIG. 1 shows an axial section of a lens mounting.

The sectional view shown in FIG. 1 shows a mounting ring 1 with two threaded through-boreholes lying diametrically opposite to each other; a setscrew 2 guided in one of the threaded boreholes; a lens 3 with a ring groove 5 around its entire periphery; and a large number of leaf spring elements 6 which here are realized as a tubular spring element with an axial slit on the mounting ring. This means that the leaf spring elements 6 are rigidly connected to the mounting ring 1 and that they act like leaf spring elements mounted at one end which by means of a bend have an additional spring effect in direction of the leaf spring axis. This bend can—as shown in FIG. 1—be a 180 degree bend directly at the fixed end or also—as shown in FIG. 3—be a 90 degree bend if the leaf spring elements are connected to the face of the mounting ring 1 by a shoulder. As can be also gathered from FIG. 3, they can, for example, also be in an arbitrary position somewhere between the fixed and the free end 4 of the leaf spring element 6 and extend over a greater distance. On the free end, a bead 6a is formed in direction of the axis of the setscrew 2. If the bead 6a is—as shown—situated on the axis of the setscrew 2, force is directed via the setscrew 2 directly onto the bead and therefore onto the lens ring groove. If the setscrew 2 engages with the leaf spring element 4 beneath the bead (this is according to another embodiment example not shown here), offsetting the action of the force upon the groove, the transfer of force goes via a portion of the lengthwise extent of the leaf spring. This has the advantage that during mechanical stresses of the lens mounting, shocks occurring in direction of the setscrew 2 are also only transferred onto the lens 3 after they have been damped.

Figure 2:
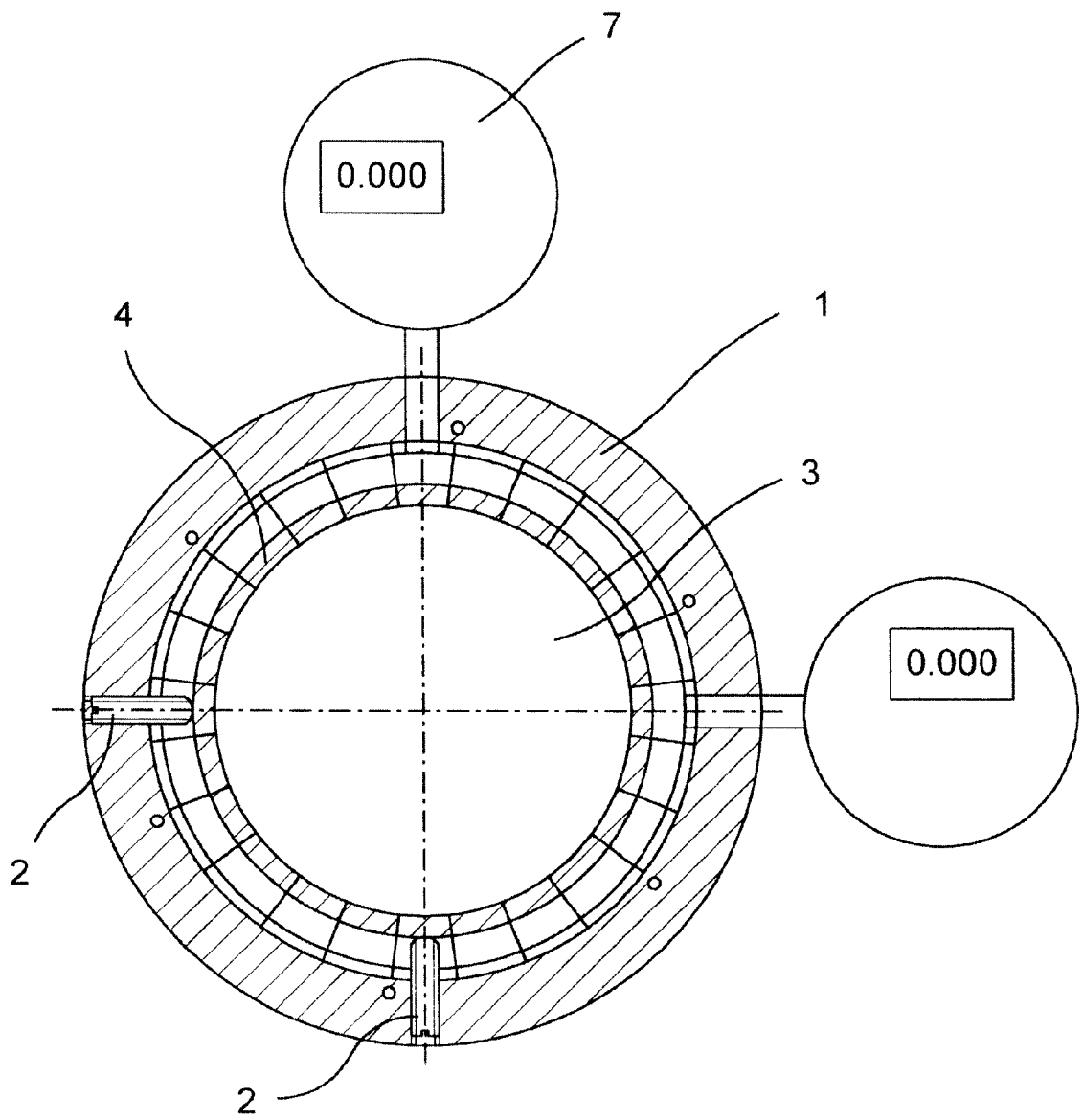
FIG. 2 shows a radial section of a lens mounting according to FIG. 1.

FIG. 2 shows a radial section through the described lens mounting. What is shown is the arrangement of the setscrews 2 at a 90 degree offset of which each has been assigned an indicating caliper 7 arranged on the axis of the setscrews 2 on the opposite side. So that all the setscrews 2 and the indicating caliper 7 contact the leaf spring elements in the center of their width, they are arranged close beside each other and their number is a multiple of four. A higher number of leaf spring elements holds the lens with a greater force. After the adjustment, the setscrews 2 are secured against rotation so that they can not maladjust themselves.

While the foregoing description and drawings represent the present invention, it will be obvious to those skilled in the art that various changes may be made therein without departing from the true spirit and scope of the present invention.

What is claimed is:

1. A radially adjustable lens mounting comprising:
   a mounting ring;
   at least one setscrew held in a threaded radial borehole in the mounting ring;
   a lens;
   a number of pretensioned spring elements distributed around the periphery of the lens whose one respective end is connected to the mounting ring and whose other respective end is connected to the lens;
   said spring elements being bent leaf spring elements mounted on one end which have a leaf spring axis, wherein the mounting is realized as a fixed connection to the mounting ring;
   said lens having a ring groove around its circumference;
   leaf spring axes being essentially parallel to the axis of the mounting ring in an area of the free ends of the pre-tensioned spring elements, said free ends of the spring elements being inserted in the ring groove; and
   each setscrew acting on one spring element.

2. The radially adjustable lens mounting according to claim 1, wherein the leaf spring elements are bent at a 90 degree angle at their free ends.

3. The radially adjustable lens mounting according to claim 1, wherein the leaf spring elements have a bead on their free ends whose shape is adapted to the ring groove.

4. The radially adjustable lens mounting according to claim 3, wherein the setscrews, the bead and the ring groove are all in one plane.

5. The radially adjustable lens mounting according to claim 4, wherein the spring elements are arranged opposite to each other in pairs.

6. The radially adjustable lens mounting according to claim 1, wherein the leaf spring elements has a bead on their free ends whose shape is adapted to the ring groove, wherein the spring elements are arranged opposite to each other in pairs, wherein the setscrews, the bead and the ring groove are all in one element and wherein precisely two setscrews are present in the mounting ring offset at an angle of 90 degrees, each of which having been assigned another threaded borehole situated diametrically opposite to it through which an indicating caliper can be inserted during the adjustment.

7. The radially adjustable lens mounting according to claim 6, wherein all threads of the threaded boreholes have the same measurements so that a decision about the insertion of the setscrews and the indicating caliper can be made depending on accessibility.

8. The radially adjustable lens mounting according to claim 1, wherein the leaf spring elements are rectangular springs arranged close to each other.

9. The radially adjustable lens mounting according to claim 8, wherein the rectangular springs are formed by a tubular spring ring with axial slits.

* * * * *